United States Patent
Krause et al.

(10) Patent No.: US 10,349,017 B2
(45) Date of Patent: Jul. 9, 2019

(54) ILLUMINATION DEVICE FOR A PROJECTOR COMPRISING A LIGHT MODULATOR

(71) Applicant: Carl Zeiss Jena GmbH, Jena (DE)

(72) Inventors: Axel Krause, Jena (DE); Enrico Geissler, Jena (DE); Bryce Anton Moffat, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 16/016,952

(22) Filed: Jun. 25, 2018

(65) Prior Publication Data

US 2018/0376114 A1    Dec. 27, 2018

(30) Foreign Application Priority Data

Jun. 26, 2017   (DE) .................. 10 2017 114 115

(51) Int. Cl.

| | |
|---|---|
| *H04N 9/31* | (2006.01) |
| *G03B 21/00* | (2006.01) |
| *G02B 5/20* | (2006.01) |
| *G03B 21/20* | (2006.01) |

(52) U.S. Cl.
CPC ............ *H04N 9/3105* (2013.01); *G02B 5/20* (2013.01); *G03B 21/005* (2013.01); *G03B 21/2033* (2013.01)

(58) Field of Classification Search
CPC ............ G03B 21/005; G03B 21/2066; G03B 21/008; G03B 21/204; G03B 21/206; H04N 9/3111; H04N 9/3114; H04N 9/3158; H04N 9/3161; H04N 9/3167; F21V 9/08; F21V 9/16; F21V 9/30
See application file for complete search history.

(56) References Cited

U.S. PATENT DOCUMENTS

| | | | |
|---|---|---|---|
| 2007/0195207 A1* | 8/2007 | Wang ................... | H04N 9/3114 348/744 |
| 2007/0297175 A1* | 12/2007 | Glent-Madsen ....... | G02B 26/04 362/282 |
| 2008/0180640 A1 | 7/2008 | Ito | |
| 2009/0134332 A1* | 5/2009 | Thompson .............. | A63F 13/04 250/348 |
| 2013/0100423 A1* | 4/2013 | Yamagishi ........... | G03B 21/204 353/98 |

(Continued)

*Primary Examiner* — Sultan Chowdhury

(74) *Attorney, Agent, or Firm* — Skaar Ulbrich Macari, P.A.

(57) ABSTRACT

An illumination device includes a light source unit and a filter wheel. The filter surface of the filter wheel includes a first surface segment and a second surface segment arranged behind the first surface segment in the direction of rotation. When the filter surface is rotated, the first and second surface segments successively extend into the illumination beam path. The first surface segment transmits only a first part of the spectrum of the emitted light and the second surface segment transmits only a different second part of the emitted light. The control unit controls the light source unit and drives the filter wheel so the light with the different spectra is emitted sequentially in time for a predetermined partial illumination duration. During the partial illumination duration of the emitted light with the first spectrum, the first or second surface segment extends into the illumination beam path.

16 Claims, 3 Drawing Sheets

(56) References Cited

U.S. PATENT DOCUMENTS

| | | | |
|---|---|---|---|
| 2014/0313489 A1 | 10/2014 | Chang et al. | |
| 2015/0253653 A1* | 9/2015 | Fujita | H04N 9/3111 353/31 |
| 2017/0371150 A1 | 12/2017 | Krause et al. | |
| 2018/0249137 A1* | 8/2018 | Kobayashi | G03B 21/14 |

* cited by examiner

ILLUMINATION DEVICE FOR A PROJECTOR COMPRISING A LIGHT MODULATOR

PRIORITY

This application claims the benefit of German Patent Application No. 102017114115.4, filed on Jun. 26, 2017, which is hereby incorporated herein by reference in its entirety.

FIELD

The present invention relates to an illumination device for a projector comprising a light modulator.

BACKGROUND

In projectors, which are often also referred to as digital projectors, the light modulator can be illuminated time-sequentially with light of different colours from different wavelength ranges in order to generate partial images time-sequentially so quickly that a viewer can then only perceive them temporally superimposed as a multicoloured image. In order to generate the different colours time-sequentially, a light source unit can for example be provided with several light sources, which emit light from different wavelength ranges and thus with different colours sequentially in time. The image generation by means of a projector is then limited to the colours of the light sources.

SUMMARY

An object of certain embodiments of the invention is to provide an illumination device for a projector comprising a light modulator, which can easily be adapted to the desired colour display by means of the projector.

The disclosure includes an illumination device for a projector comprising a light modulator can comprise a light source unit, which emits at least light with a first spectrum and light with a second spectrum which differs from the first spectrum, an illumination beam path, which guides the light from the light source unit to its end in order to illuminate the light modulator, a filter wheel comprising a filter surface, which filter surface is rotatable about an axis and extends only partially into the illumination beam path, a drive for rotating the filter wheel, and a control unit. The filter surface comprises a first surface segment and a second surface segment, which is arranged behind the first surface segment in the direction of rotation, for the light with the first spectrum. When the filter surface is rotated, the first and second surface segments successively extend into the illumination beam path and the first surface segment transmits only a first part of the spectrum of the emitted light with the first spectrum in the illumination beam path and the second surface segment transmits only a second part of the spectrum of the emitted light with the first spectrum in the illumination beam path, wherein the first and second parts are different. The control unit controls the light source unit and the drive such that the light with the first spectrum and the light with the second spectrum are emitted sequentially in time in each case for a predetermined partial illumination duration and that, during the partial illumination duration with the light with the first spectrum, the first or second surface segment extends into the illumination beam path.

The disclosure also includes an illumination device for a projector comprising a light modulator can comprise a light source unit, which comprises at least a first light source, which emits light with a first spectrum, and a second light source, which emits light with a second spectrum which differs from the first spectrum. An illumination beam path of the illumination device can guide the light from the light sources to its end in order to illuminate the light modulator. Furthermore, the illumination device can contain a filter wheel comprising a filter surface, which filter surface is rotatable about an axis and extends only partially into the illumination beam path. Furthermore, the illumination device can comprise a drive for rotating the filter wheel, as well as a control unit. The filter surface can comprise a first surface segment and a second surface segment, which is arranged behind the first surface segment in the direction of rotation, for the first light source, wherein, when the filter surface is rotated, the first and second surface segments successively extend into the illumination beam path and the first surface segment transmits only a first part of the spectrum of the light emitted by the first light source in the illumination beam path and the second surface segment transmits only a second part of the spectrum of the light emitted by the first light source in the illumination beam path, wherein the first and the second parts are different.

The control unit can control the light source unit and the drive such that the light sources emit their light sequentially in time in each case for a predetermined partial illumination duration and that, during the partial illumination duration of the first light source, the first or second surface segment extends into the illumination beam path. Thus, for example, during a first partial illumination duration of the first light source, the first surface segment can extend into the illumination beam path and, during a second partial illumination duration of the first light source, the second surface segment can extend into the illumination beam path. However, it is also possible, during the partial illumination duration of the first light source, first of all for the first or second surface segment to extend into the illumination beam path and subsequently for the second or first surface segment to extend into the illumination beam path. The same applies to the control of the light source unit and of the drive in relation to the emitted light with the first spectrum and the emitted light with the second spectrum. If in the following description the light from a light source of the light source unit is discussed, this applies accordingly to the light with the corresponding spectrum emitted by the light source unit (the light source unit can comprise a single light source or several light sources).

By means of the filter wheel, spectral ranges can thus be selected from the first spectrum, which are then used for the image generation. It is therefore possible to carry out an individual adjustment of the spectra for a projector without having to alter the light source unit itself. Only the filter wheel has to be provided.

The first surface segment can transmit light from the second light source in the illumination beam path and the second surface segment cannot transmit light from the second light source in the illumination beam path. It is thus possible, with the second surface segment, selectively to transmit only the second part of the spectrum from the first light source in the illumination beam path and to utilize it for the image generation by means of the projector.

The first spectrum can comprise a first partial spectrum, which lies in the visible wavelength range, and a second partial spectrum, which lies in the infrared range. Furthermore, the second spectrum can (preferably only) lie in the visible wavelength range and differ from the first partial spectrum. The first surface segment can be formed such that it transmits only light from the visible wavelength range in the illumination beam path, and the second surface segment can be formed such that it transmits only light from the infrared range in the illumination beam path. It is thus possible to illuminate a projector time-sequentially by means of the illumination device according to the invention such that the projector displays a colour image (first partial spectrum and second spectrum) and an infrared image (second partial spectrum) sequentially in time so quickly that for a user the colour image and the infrared image are generated virtually superimposed. This can be utilized for example for a projector which is used in a flight simulator. By means of the infrared image, e.g. the use of night vision devices can be practised.

The filter surface can comprise a third surface segment and a fourth surface segment, which is arranged behind the third surface segment in the direction of rotation, for the second light source. When the filter surface is rotated, the third and fourth surface segments can successively extend into the illumination beam path and the third surface segment can transmit only a first part of the spectrum of the light emitted by the second light source in the illumination beam path and the fourth surface segment can transmit only a second part of the spectrum of the light emitted by the second light source in the illumination beam path, wherein the first and second parts of the spectrum of the light emitted by the second light source are different.

The control unit can control the light source unit and the drive such that, during the partial illumination duration of the second light source, the third or fourth surface segment extends into the illumination beam path. Here too, during the partial illumination duration of the second light source, the third and fourth surface segments can in turn successively extend into the illumination beam path. Alternatively, it is for example possible, during a first partial illumination duration of the second light source, for the third surface segment to extend into the illumination beam path and, during a subsequent partial illumination duration of the second light source, for the fourth surface segment to extend into the illumination beam path.

In particular, for each light source of the light source unit at least two surface segments can be formed in the filter surface, each of which transmits only a part of the spectrum of the corresponding light source in the illumination beam path. By means of the two filter surfaces and through suitable control for positioning the surface segments in the illumination beam path, the spectrum of the corresponding light source can be divided into two partial spectra. It is of course also possible to provide more than two filter surfaces for one light source. The filter surfaces are then preferably formed such that the spectrum of the corresponding light source is split into the same number of partial spectra as there are filter surfaces provided. In other words, for one light source of the light source unit, n surface segments (wherein n is an integer greater than or equal to 2) are provided, which are designed such that the light from the corresponding light source is split into n partial spectra that are different. A broad emission spectrum of a corresponding light source can thus advantageously be split into narrower spectra and utilized for the time-sequential illumination of the light modulator of the projector.

The light source unit can comprise a third light source, which emits light with a third spectrum (e.g. which lies only in the visible wavelength range) which differs from the first and second spectra. The three light sources can particularly preferably emit light from the red, green and blue wavelength ranges (sequentially in time).

By light from the visible wavelength range is meant, in particular, the wavelength range of from 380 to 700 nm. The blue wavelength range can extend, for example, from 430 to 490 nm. The green wavelength range can extend from 490 to 570 nm. The red wavelength range can extend from 640 to 700 nm. By light from the infrared range is meant, in particular, light with a wavelength of greater than 700 nm or greater than 780 nm. In particular, the wavelength can be in the range of from 700 nm (or 780 nm) to 1000 nm, to 2000 nm or to 3000 nm.

The filter surface can be formed transmissive. However, it is also possible for the filter surface to be reflective.

The filter surface can be formed annular.

Between the light source unit and the filter surface an integrator or a light mixing rod can be provided, which serves to homogenize the light emitted by the light sources in order then to be able to illuminate the light modulator as uniformly as possible two-dimensionally.

The light source unit can comprise a cooling device, e.g. which is formed as a passive and/or active cooling device. The light source unit can be cooled in operation using the cooling device. In particular, the cooling device can cool at least one light source of the light source unit in operation.

The light source unit can comprise a light trap for scattered light. The light trap can be formed e.g. absorbing. For example, at least a part (e.g. a housing part) of the light source unit can be blackened.

The light source unit can comprise at least one semiconductor-based light source or at least one semiconductor light source (such as e.g. an LED or a laser diode).

The light source unit can comprise a separate light source (in particular a semiconductor light source) for light of each spectrum. However, it is also possible for the light source unit to comprise only one or several light sources (e.g. semiconductor light source(s)), which all emit light with the same spectrum (e.g. in the blue wavelength range). The light with the other spectra can be generated e.g. by means of at least one fluorescent layer or by means of the fluorescence effect. Such a fluorescent layer can be provided e.g. on a rotating wheel, as is the case in the so-called laser-phosphor modules which are marketed e.g. by the company Osram.

The light source unit can comprise at least one light source. The at least one light source (or several or all light sources of the light source unit) can have an operating voltage (or forward voltage) which is in the range of from 2 V to 240 V. This operating voltage relates to a single light source (e.g. LED or laser diode), even if these are connected in series, as can be the case in practice. In the case of semiconductor light sources, the operating voltage can be e.g. in the range of from 2 V to 6 V. In the case of very high intensity lamps (e.g. mercury-vapour lamps), the operating voltage can be in the range of from 50 V to 160 V.

The disclosure further includes a projector with a light modulator and an illumination device. The light modulator is in particular a two-dimensional light modulator and can be formed e.g. as a tilting mirror matrix, LCD module or LCoS module.

In particular, the projector can be formed such that the different partial images are generated time-sequentially, since the light source unit emits the light from the different light sources time-sequentially. The partial images are preferably generated one behind the other so quickly that a user can no longer resolve them individually, but rather perceives only the superimposition of the partial images as an overall image.

The projector can comprise two light modulators arranged one behind the other. In particular, in this case an imaging optical system can be provided which images the first light modulator onto the second light modulator. The imaging optical system can be formed for example as a 1:1 imaging optical system. By providing two light modulators connected one behind the other, the maximum contrast of the projector is increased.

In the following, the invention is explained in yet more detail by means of embodiment examples with reference to the attached drawings, which also disclose features essential to the invention. These embodiment examples merely serve for illustration and are not to be interpreted as limiting. For example, a description of an embodiment example with a plurality of elements or components is not to be interpreted to the effect that all of these elements or components are necessary for the implementation. Rather, other embodiment examples can also contain alternative elements and components, fewer elements or components or additional elements or components. Elements or components of different embodiment examples can be combined with each other, unless indicated otherwise. Modifications and adjustments which are described for one of the embodiment examples can also be applicable to other embodiment examples. For the avoidance of repetition, identical elements or those corresponding to each other are labelled with the same reference numbers in different figures and are not explained multiple times.

It is understood that the features named above and those yet to be explained below can be used not only in the stated combinations but also in other combinations or alone, without departing from the scope of the present invention.

Figure 1:
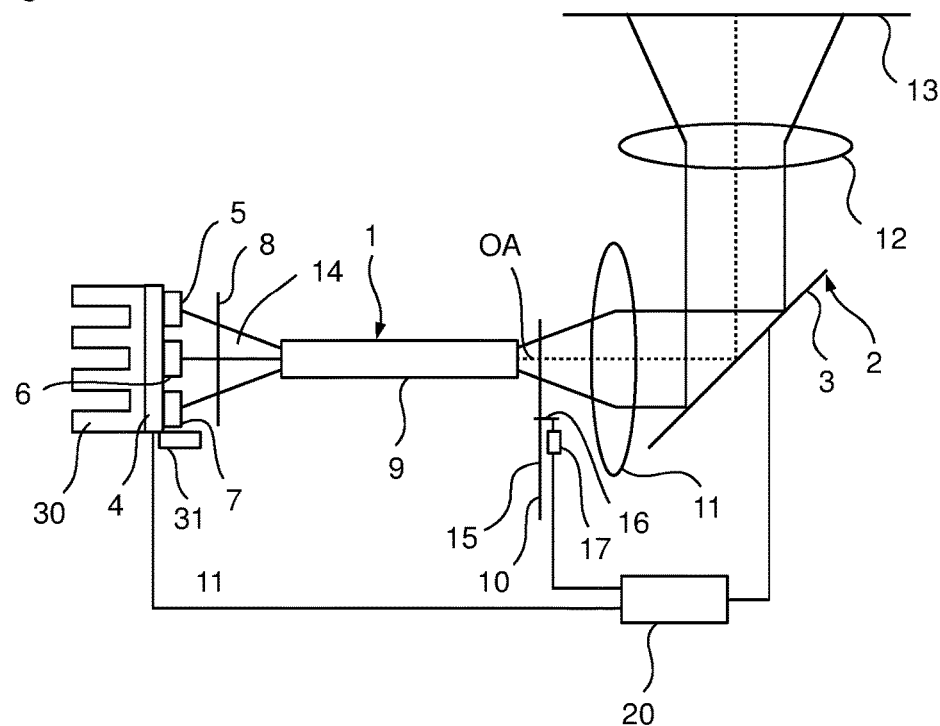
FIG. 1 is a schematic view of the illumination device according to the invention and of the projector according to the invention according to a first embodiment.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

The invention is explained in yet more detail below with the aid of embodiment examples with reference to the attached drawings, which also disclose features essential to the invention. These embodiment examples merely serve the purpose of illustration and are not to be interpreted as limiting. For example, a description of an embodiment example with a plurality of elements or components is not to be interpreted to the effect that all of these elements or components are necessary for the implementation. Rather, other embodiment examples can also contain alternative elements and components, fewer elements or components or additional elements or components. Elements or components of different embodiment examples can be combined with each other, unless otherwise indicated. Modifications and alterations which are described for one of the embodiment examples can also be applicable to other embodiment examples. To avoid repetitions, the same or corresponding elements are given the same reference numbers in different figures and are not explained repeatedly.

In the embodiment shown in FIG. 1, the illumination device 1 according to the invention is provided in a projector 2 according to the invention, which comprises a light modulator 3 (e.g. a tilting mirror matrix).

The projector 2 contains a light source unit 4, which comprises a first, second and third light source 5, 6, 7. The light sources 5-7 can be formed for example as LED light sources 5-7, which emit light with different spectra. Thus, the first light source 5 can emit red light, the second light source 6 can emit green light and the third light source 7 can emit blue light. The light source unit 4 can be controlled such that the light sources 5-7 emit their light sequentially in time, with the result that the light source unit 4 can also be referred to as a sequential light source unit 4. The light source unit 4 can also be realized with one or several so-called laser-phosphor modules. The light source unit 4 can comprise a cooling device 30 for cooling (in particular the light sources 5-7). The cooling device 30 can be formed as a passive and/or active cooling device 30. Furthermore, the light source unit 4 can comprise a light trap 31 for scattered light, as is drawn in schematically in FIG. 1. The light trap 31 can be realized e.g. by a blackening of a housing part of the light source unit 4.

In the embodiment described here, the first light source 5 can emit light in a wavelength range of for example from 640 to 700 nm, the second light source 6 can emit light in a wavelength range of from 490 to 570 nm and the third light source 7 can emit light in a wavelength range of from 430 to 490 nm. The specific wavelength range of each light source can be much smaller than the wavelength range indicated in each case. In addition, only the second light source 6 still emits radiation in the infrared range, wherein here in particular the range of from greater than 700 nm to 1000 nm, to 2000 nm or to 3000 nm is meant.

The light from the light sources 5-7 passes through an ultraviolet filter 8, then through an integrator 9 or light mixing rod 9, and a filter wheel 10 arranged after the light mixing rod 9. The light passing through the filter wheel 10 is directed by means of a first optical system 11 onto the light modulator 3, which is thereby illuminated as uniformly as possible.

The light modulated by the light modulator 3 is projected by means of a second optical system 12 onto a projection surface 13 in order to generate there an image to be represented.

The region from the light source unit 4 up to the modulator 3 can be referred to as the illumination beam path 14, wherein the first optical system 11 may or may not be part of the illumination beam path 14. Furthermore, the ultraviolet filter 8 and the light mixing rod 9 are optional and can also be omitted.

Figure 2:
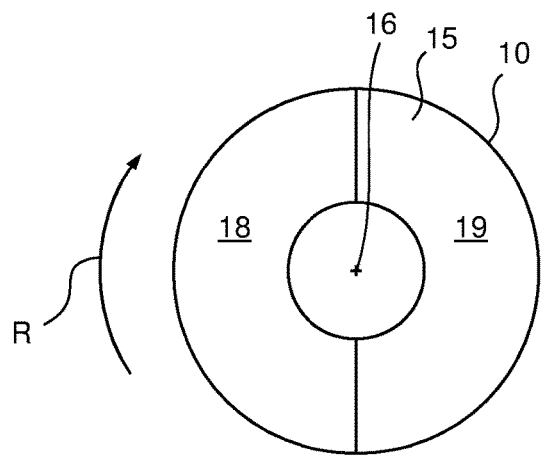
FIG. 2 is a top view onto the filter wheel of FIG. 1.

As can be seen in the top view onto the filter wheel 10 in FIG. 2, the filter wheel 10 comprises a filter surface 15 which can be annular, for example. The filter surface 15 is arranged perpendicular or at an angle other than 90° to the optical axis OA of the illumination beam path 14 such that only a part of the filter surface 15 always extends into the illumination beam path 14. Furthermore, the filter wheel 10 is formed such that the filter surface 15 is rotatable about an axis 16. For this purpose, a drive 17 is provided. The axis 16 can extend parallel to the optical axis OA or at an angle of greater than 0° (and thus no longer parallel to the optical axis OA).

In the direction of rotation R, the filter surface 15 comprises two surface segments 18, 19 arranged one behind the other. The first surface segment 18 is only transmissive for visible light and here e.g. for a wavelength range of from 430 to 700 nm and is not transmissive for longer wavelengths. The second surface segment 19 on the other hand is not transmissive for visible light and therefore for wavelengths of from 430 to 700 nm and is transmissive for wavelengths of longer than 700 nm. The filter wheel 10 can also be referred to as a shutter wheel. In the embodiment described here, the two surface segments 18, 19 in each case extend through 180° in the circumferential direction.

Figure 3:
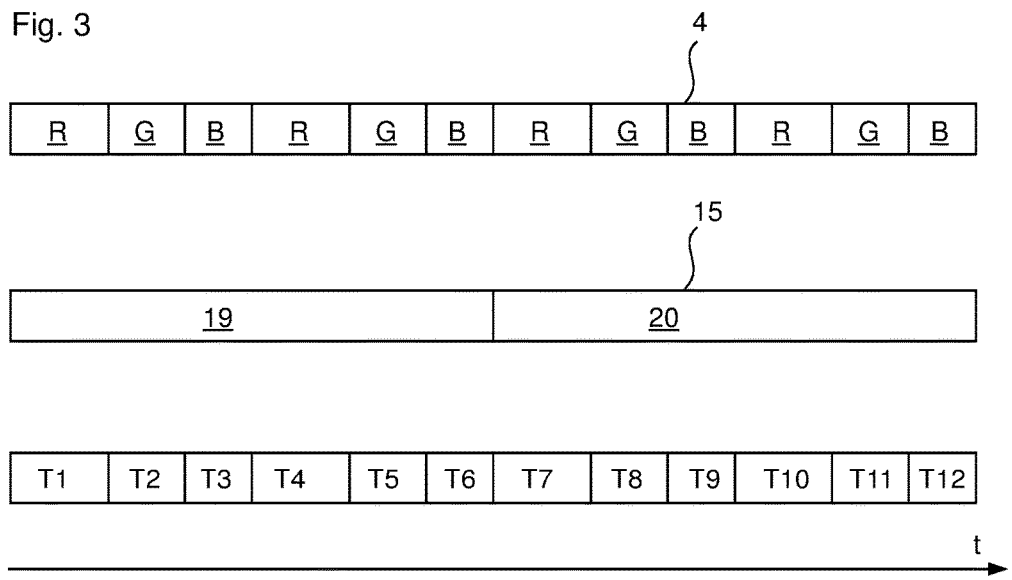
FIG. 3 is a schematic representation for illustration of the partial images T1-T12 generated sequentially in time.

The illumination device 1 further contains a control unit 20 which controls the light source unit 4 and the drive 17 in the manner as represented schematically in FIG. 3. In FIG. 3 the time t is plotted along the x-axis. For the light source unit 4, the predetermined partial illumination duration is always plotted as a rectangle with the letter R, G or B, during which, for red light (R), only the first light source 5 emits light with the corresponding wavelength, for green light (G), only the second light source 6 emits light with the corresponding wavelength or, for blue light (B), only the third light source 7 emits light with the corresponding wavelength. There is thus a time-sequential light emission of red, green and blue light.

Also drawn in is the time at which the first and second surface segment 18, 19 extends in the illumination beam path 14 because of the rotation of the filter wheel 10, with the result that twelve resolved partial images T1, T2, T3, . . . T12 can be generated by means of the modulator 3 as the latter is illuminated during the times T1, T2, T3, . . . T12 with light from the corresponding spectral ranges. Thus, at times of the partial images T1 and T4 it is illuminated with red light, at times of the partial images T2 and T5 it is illuminated with green light and at times of the partial images T3 and T6 it is illuminated with the blue light. At the times of the partial images T8 and T11 it is illuminated with radiation from the infrared range, and at the times of the partial images T7, T9, T10 and T12 the modulator is not illuminated at all and is thus switched to black.

Through this type of control of the light source unit 4 and of the drive 17 the modulator 3 is illuminated time-sequentially with red, green and blue light as well as infrared radiation, with the result that a visible image based on the colours red, green and blue as well as, in addition, an infrared image can be generated. This is carried out in a known manner in that the modulator 3 is controlled accordingly for each partial image T1-T12 and the partial images T1-T12 follow each other temporally so quickly that a viewer cannot distinguish the partial images T1-T12 temporally and thus perceives only the temporal superimposition of the partial images T1-T12. For a viewer, a colour image and an infrared image are thus generated simultaneously.

When the projector 2 according to the invention is used in a flight simulator, the infrared image can, for example, be utilized in order to be able to practise night vision conditions using a night vision device. For example, the flight simulator can thus generate the desired infrared images which a user of the flight simulator can perceive with his night vision device. With such a flight simulator, for example the flying and operation of an aeroplane or of a helicopter can be simulated.

The projector 2 according to the invention can in particular be formed so that such a high contrast is achieved by its setup that no stimulation of the night vision device is caused by the partial images T7, T9, T10 and T12. Furthermore, a very high contrast of the projector 2 also helps in the representation of low brightness values. If, for a contrast of from completely on (highest brightness) to completely off (lowest brightness), the projector 2 achieves the value of approx. 2.5×106:1, the intensities of the low brightness values which lie in an order of magnitude of from 10-5 to 10-6 of the maximum intensity can be represented correctly for a γ value of 2.2. The natural conditions for a night vision device can thus be simulated well.

Figure 4:
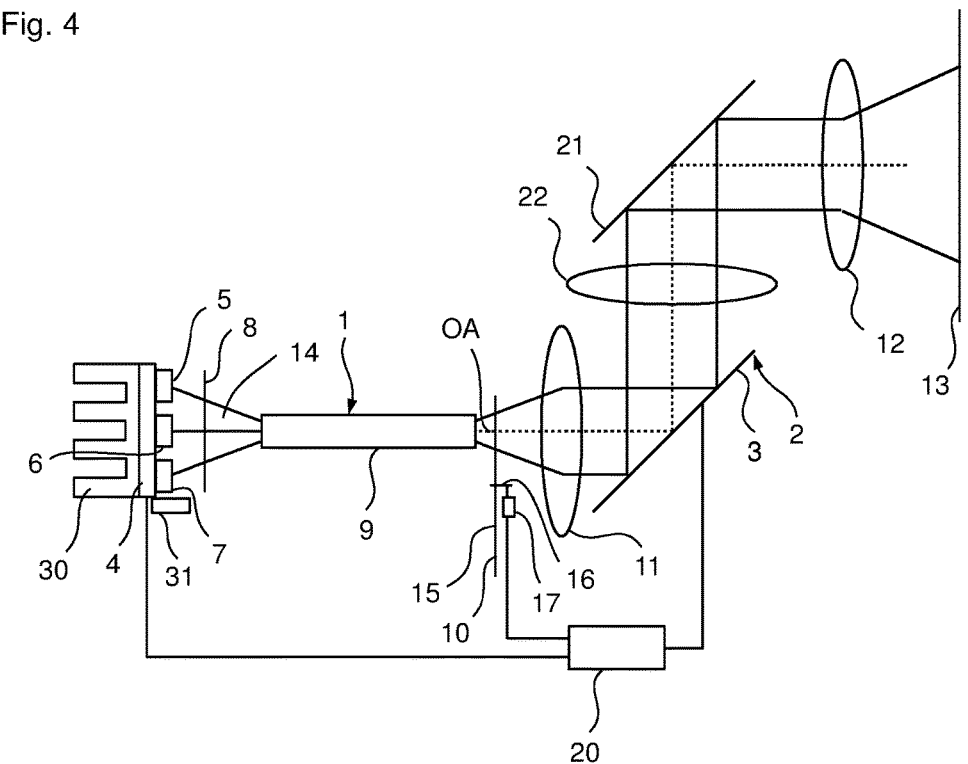
FIG. 4 is a schematic representation of a further embodiment of the projector according to the invention.

For example, such a contrast can be achieved in that a second light modulator 21 is arranged after the light modulator 3, as is shown in the case of the variant of the projector 2 according to the invention in FIG. 4. An imaging optical system 22, which images the light modulator 3 onto the second light modulator 21, is preferably arranged between the two light modulators 3 and 21. The imaging optical system 22 can be, for example, a 1:1 imaging optical system.

The illumination device according to the invention is characterized by a mechanically simple setup. In particular, only one rotating filter wheel is required in order to realize the described simultaneous generation of a colour image in the visible wavelength range and of an infrared image.

The ratio of the outputs in the visible and in the infrared spectral range can be adapted by further filters (not shown) in the beam path of the projector and in particular in the illumination beam path 14. Various night vision conditions such as a bright full moon and new moon can thus be simulated.

Of course, the spectral properties of the filter wheel 10 and of the light source unit 4 can also be designed differently. For example, the second light source 6 can thus be designed such that it only emits light in the wavelength range of from 490 to 570 nm. The first light source 5 can be designed such that it emits red light in the range of from 640 to 690 nm. In this case, the first surface segment 18 of the filter surface 15 can be designed such that it transmits wavelengths of from 430 to 660 nm and no longer transmits longer wavelengths. The second surface segment 19 can be designed such that it does not transmit wavelengths of from 430 to 660 nm and transmits wavelengths of longer than 660 nm. In this case, at times of the partial images T1 and T4 there is a first red illumination, at times of the partial images T2 and T5 there is a green illumination and at times of the partial images T3 and T6 there is a blue illumination. At times of the partial images T7 and T10 there is a second red illumination and at times of the partial images T8, T9, T11 and T12 there is no illumination. This can be used e.g. to generate a better colour display of the colour image in the visible wave range.

Figure 5:
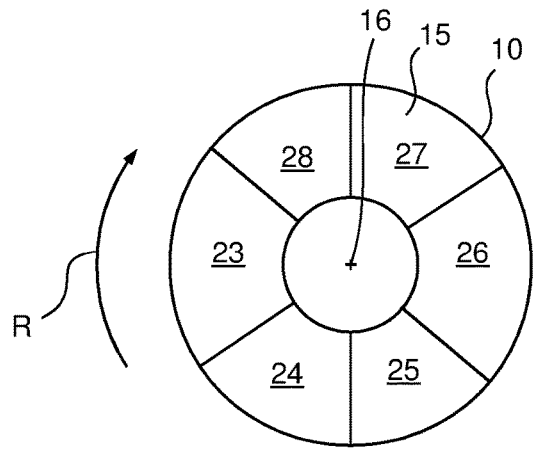
FIG. 5 is a top view of a further embodiment of the filter wheel.

In the embodiments described so far, the filter surface 15 of the filter wheel 10 contains precisely two surface segments 18, 19. In FIG. 5, a development is shown in which the filter surface 15 comprises six surface segments 23 to 28 which are arranged one behind the other in the circumferential direction R, wherein in each case two surface segments are assigned to one of the three light sources 5-7. For instance, the surface segments 23 and 26 are assigned to the first light source 5, wherein the surface segment 23 only transmits wavelengths of from 640 to 670 nm and does not transmit other wavelengths and the surface segment 26 only transmits wavelengths in the range of from 670 to 700 nm and does not transmit other wavelengths. With the surface segments 23 and 26 two different red hues can thus be generated.

Similarly, the surface segments 24 and 27 are assigned to the second light source 6, wherein the surface segment 24 only transmits wavelengths in the range of from 490 to 530 nm and the surface segment 27 only transmits wavelengths in the range of from 530 to 570 nm. The surface segments 25 and 28 are assigned to the third light source 7, wherein the surface segment 25 only transmits wavelengths in the range of from 430 to 460 nm and the surface segment 28 only transmits wavelengths in the range of from 460 to 490 nm.

Figure 6:
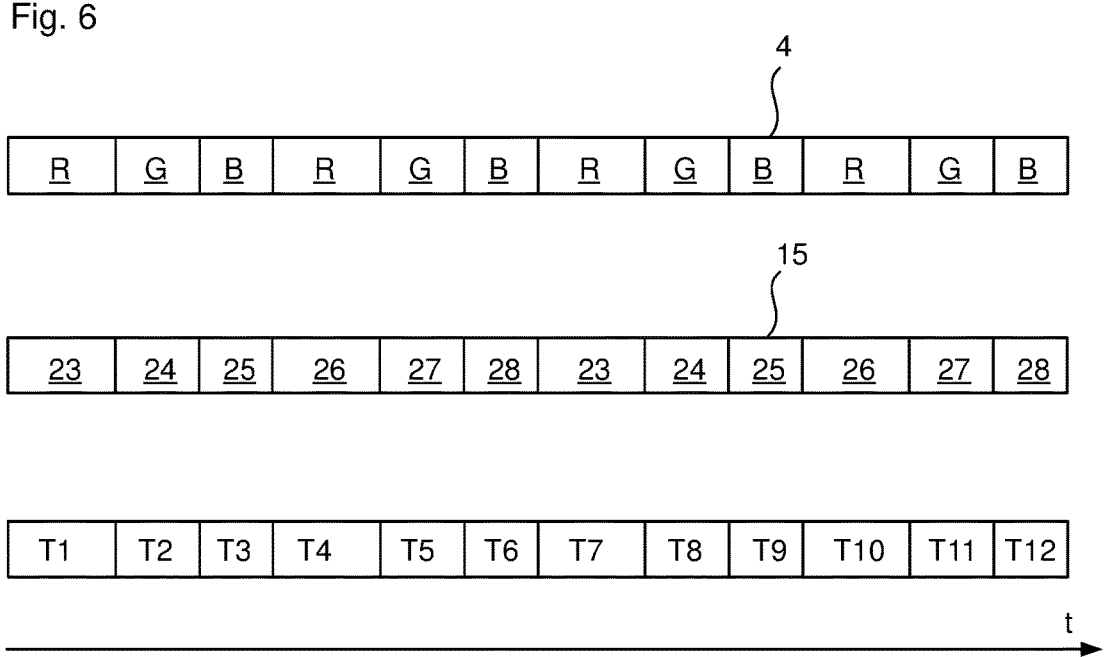
FIG. 6 is a schematic representation for illustration of the partial images T1-T12 generated sequentially in time according to a further embodiment.

In FIG. 6, similarly to FIG. 3, the control of the light source unit 4 and of the drive 17 and thus of the position of the filter surfaces is shown. At times of the partial images T1, T4, T7 and T11 red hues can be modulated, wherein at the times of the partial images T1 and T7 wavelengths from the range of from 640 to 670 nm are transmitted and at the times of the partial images T4 and T10 wavelengths from the range of from 670 to 700 nm are transmitted. This applies accordingly to the colour green at the times of the partial images T2, T5, T8 and T11 as well as to the colour blue at the times T3, T6, T9 and T12.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An illumination device for a projector, the projector including a light modulator, the illumination device comprising:
    a light source unit, which emits at least light with a first spectrum and light with a second spectrum which differs from the first spectrum;
    an illumination beam path, which guides the light from the light source unit to its end in order to illuminate the light modulator;
    a filter wheel comprising a filter surface that is rotatable about an axis and extends only partially into the illumination beam path;
    a drive for rotating the filter wheel; and
    a control unit,
    wherein the filter surface comprises a first surface segment and a second surface segment arranged adjacent to the first surface segment in the direction of rotation, for the light with the first spectrum,
    wherein, when the filter surface is rotated, the first and second surface segments successively extend into the illumination beam path and the first surface segment transmits only a first portion of the light with the first spectrum in the illumination beam path and the second surface segment transmits only a second portion of the light with the first spectrum in the illumination beam path, wherein the first and second portions are different spectral ranges, and
    wherein the control unit controls the light source unit and the drive such that the light with the first spectrum and the light with the second spectrum are emitted sequentially in time in each case for a predetermined partial illumination duration and that, during the partial illumination duration with the light with the first spectrum, the first or second surface segment extends into the illumination beam path.

2. The illumination device according to claim 1, wherein the first surface segment transmits light with the second spectrum in the illumination beam path and the second surface segment does not transmit light with the second spectrum in the illumination beam path.

3. The illumination device according to claim 2,
    wherein the first portion of the first spectrum lies in the visible wavelength range and the second portion of the first spectrum lies in the infrared range,
    wherein the second spectrum lies in the visible wavelength range and differs from the first portion of the first spectrum,
    wherein the first surface segment transmits only light from the visible wavelength range in the illumination beam path, and
    wherein the second surface segment transmits only light from the infrared range in the illumination beam path.

4. The illumination device according to claim 3,
    wherein the filter surface comprises a third surface segment and a fourth surface segment, which are arranged adjacent to one another in the direction of rotation,
    wherein, when the filter surface is rotated, the third and fourth surface segments successively extend into the illumination beam path and the third surface segment transmits only a first portion of light with the second spectrum in the illumination beam path and the fourth surface segment transmits only a second portion of light with the second spectrum in the illumination beam path, and
    wherein the control unit controls the light source unit and the drive such that, during the partial illumination duration with the light with the second spectrum, the third or fourth surface segment extends into the illumination beam path.

5. The illumination device according to claim 2,
    wherein the filter surface comprises a third surface segment and a fourth surface segment, which are arranged adjacent to one another in the direction of rotation,
    wherein, when the filter surface is rotated, the third and fourth surface segments successively extend into the illumination beam path and the third surface segment transmits only a first portion of light with the second spectrum in the illumination beam path and the fourth surface segment transmits only a second portion of light with the second spectrum in the illumination beam path, and
    wherein the control unit controls the light source unit and the drive such that, during the partial illumination duration with the light with the second spectrum, the third or fourth surface segment extends into the illumination beam path.

6. The illumination device according to claim 1,
    wherein the first portion of the first spectrum lies in the visible wavelength range and the second portion of the first spectrum lies in the infrared range,
    wherein the second spectrum lies in the visible wavelength range and differs from the first portion of the first spectrum, wherein the first surface segment transmits only light from the visible wavelength range in the illumination beam path, wherein the second surface segment transmits only light from the infrared range in the illumination beam path, wherein the filter surface comprises a third surface segment and a fourth surface segment, which are arranged adjacent to one another in the direction of rotation, wherein, when the filter surface is rotated, the third and fourth surface segments successively extend into the illumination beam path and the third surface segment transmits only a first portion of light with the second spectrum in the illumination beam path and the fourth surface segment transmits only a second portion of light with the second spectrum in the illumination beam path, and wherein the control unit controls the light source unit and the drive such that, during the partial illumination duration with the light with the second spectrum, the third or fourth surface segment extends into the illumination beam path.

7. The illumination device according to claim 1, wherein the light source unit emits light with a third spectrum which differs from the first and second spectra.

8. The illumination device according to claim 7, wherein each of the first, second and third spectra lies in the red, green or blue wavelength range.

9. The illumination device according to claim 1, wherein the filter surface is transmissive.

10. The illumination device according to claim 1, wherein the light source unit comprises a cooling device.

11. The illumination device according to claim 1, wherein the light source unit comprises at least one semiconductor-based light source.

12. The illumination device according to claim 1, wherein the light source unit comprises a light trap for scattered light from the light source unit.

13. The illumination device according to claim 1, wherein the light source unit comprises at least one light source the operating voltage of which is in the range of from 2 Volts to 240 Volts.

14. A projector, comprising a light modulator and the illumination device according to claim 1.

15. An illumination device for a projector, the projector including a light modulator, the illumination device comprising:
 a light source unit, which emits at least light with a first spectrum and light with a second spectrum which differs from the first spectrum;
 an illumination beam path, which guides the light from the light source unit to its end in order to illuminate the light modulator;
 a filter wheel comprising a filter surface-that is rotatable about an axis and extends only partially into the illumination beam path;
 a drive for rotating the filter wheel; and
 a control unit,
 wherein the filter surface comprises a first surface segment and a second surface segment arranged adjacent to the first surface segment in the direction of rotation, for the light with the first spectrum,
 wherein, when the filter surface is rotated, the first and second surface segments successively extend into the illumination beam path and the first surface segment transmits only a first portion of the light with the first spectrum in the illumination beam path and the second surface segment transmits only a second portion of the light with the first spectrum in the illumination beam path, wherein the first and second portions are different spectral ranges, and
 wherein the control unit controls the light source unit and the drive such that the light with the first spectrum and the light with the second spectrum are emitted sequentially in time in each case for a predetermined partial illumination duration and that, during the partial illumination duration with the light with the first spectrum, the first or second surface segment extends into the illumination beam path,
 wherein the first portion of the first spectrum lies in the visible wavelength range and the second portion of the first spectrum lies in the infrared range,
 wherein the second spectrum lies in the visible wavelength range and differs from the first portion of the first spectrum,
 wherein the first surface segment transmits only light from the visible wavelength range in the illumination beam path, and
 wherein the second surface segment transmits only light from the infrared range in the illumination beam path.

16. An illumination device for a projector, the projector including a light modulator, the illumination device comprising:
 a light source unit, which emits at least light with a first spectrum and light with a second spectrum which differs from the first spectrum;
 an illumination beam path, which guides the light from the light source unit to its end in order to illuminate the light modulator;
 a filter wheel comprising a filter surface-that is rotatable about an axis and extends only partially into the illumination beam path;
 a drive for rotating the filter wheel; and
 a control unit,
 wherein the filter surface comprises a first surface segment and a second surface segment arranged adjacent to the first surface segment in the direction of rotation, for the light with the first spectrum,
 wherein, when the filter surface is rotated, the first and second surface segments successively extend into the illumination beam path and the first surface segment transmits only a first portion of the light with the first spectrum in the illumination beam path and the second surface segment transmits only a second portion of the light with the first spectrum in the illumination beam path, wherein the first and second portions are different spectral ranges, and
 wherein the control unit controls the light source unit and the drive such that the light with the first spectrum and the light with the second spectrum are emitted sequentially in time in each case for a predetermined partial illumination duration and that, during the partial illumination duration with the light with the first spectrum, the first or second surface segment extends into the illumination beam path,
 wherein the filter surface comprises a third surface segment and a fourth surface segment, which are arranged adjacent to one another in the direction of rotation,
 wherein, when the filter surface is rotated, the third and fourth surface segments successively extend into the illumination beam path and the third surface segment transmits only a first portion of light with the second spectrum in the illumination beam path and the fourth surface segment transmits only a second portion of light with the second spectrum in the illumination beam path, and wherein the control unit controls the light source unit and the drive such that, during the partial illumination duration with the light with the second spectrum, the third or fourth surface segment extends into the illumination beam path.

* * * * *